United States Patent [19]

Vanderkooi, Jr.

[11] Patent Number: 4,753,975

[45] Date of Patent: Jun. 28, 1988

[54] POLYESTER MOLDING COMPOSITION CONTAINING LOW VISCOSITY POLYESTER REACTION PRODUCT

[75] Inventor: Nicholas Vanderkooi, Jr., Pompton Plains, N.J.

[73] Assignee: Allied-Signal Inc., Morris Township, Morris County, N.J.

[21] Appl. No.: 659,033

[22] Filed: Oct. 9, 1984

Related U.S. Application Data

[63] Continuation of Ser. No. 493,492, May 11, 1983, abandoned.

[51] Int. Cl.$^4$ .............................................. C08L 67/02
[52] U.S. Cl. ................... 524/539; 524/503; 524/504; 524/513; 525/58; 525/69; 525/176; 525/438; 525/444
[58] Field of Search ............... 525/444, 58, 69, 176, 525/438; 524/503, 504, 513, 539

[56] References Cited

U.S. PATENT DOCUMENTS

| | | | |
|---|---|---|---|
| 3,629,366 | 12/1971 | Brinkmann | 525/444 |
| 3,843,615 | 10/1974 | Herwig | 525/444 |
| 3,953,394 | 4/1976 | Fox | 525/444 |
| 3,962,368 | 6/1976 | Herwig | 525/444 |
| 4,212,791 | 7/1980 | Avery | 525/444 |
| 4,223,113 | 9/1980 | Bier | 525/444 |
| 4,327,007 | 4/1982 | Vanderkooi | 524/394 |

FOREIGN PATENT DOCUMENTS

15145 9/1980 European Pat. Off. .

OTHER PUBLICATIONS

The Condensed Chemical Dictionary, 10th Edition, 1981, p. 951.
The American Heritage Dictionary, 2nd College Ed., 1982, p. 1164.

*Primary Examiner*—Patricia Short
*Attorney, Agent, or Firm*—Roger H. Criss; Richard A. Negin

[57] ABSTRACT

A composition comprising polyethylene terephthalate which contains up to 10% based on the weight of the polyethylene terephthalate of the reaction product of a low viscosity linear saturated polyester having an intrinsic viscosity of from 0.05 to 0.6 and preferably 0.1 to 0.4 and a compound having at least one functional group selected from the class consisting of anhydrides, epoxides, and hydroxyls.

15 Claims, No Drawings

POLYESTER MOLDING COMPOSITION CONTAINING LOW VISCOSITY POLYESTER REACTION PRODUCT

This application is a continuation of application Ser. No. 493,492 filed May 11, 1983, now abandoned.

BACKGROUND OF THE INVENTION

1. Field of the Invention

This invention relates to an additive for a linear saturated polyester molding composition; more particularly, this invention relates to a nucleating agent which is the reaction product of a low viscosity linear saturated polyester and a compound having at least one functional group selected from the class consisting of anhydrides, epoxides, and hydroxyls.

2. Description of the Prior Art

It is known in the art to use nucleating agents in crystallizable polymers such as linear saturated polyesters of aromatic dicarboxylic acids. A variety of nucleating agents have been disclosed. Included are inert particulate nucleating agents as well as a variety of salts of hydrocarbon and polymeric carboxylic acids.

U.S. Pat. No. 3,843,615 discloses a linear saturated polyester composition containing from 0.05 to 2% by weight of a cross-linked saturated polyester of terephthalic acid or an ester forming derivative thereof, a diol having from 2 to 10 carbon atoms, and 0.01 to 3% by weight calculated on the cross-linked saturated polyester of at least one cross-linking polyfunctional compound. The cross-linking polyfunctional compound has more than two groups capable of forming esters. Such groups include acids, anhydrides and epoxides. The cross-linked saturated polyester is crosslinked so that it is insoluble in a mixture of phenol and tetrachloroethane having a ratio of 3:2.

A molding formulation based on a linear saturated polyester, such as polyethylene terephthalate, should result in molded product having good physical properties including flexural strength, modulus, tensile strength and impact properties. Further, the molding compound should also have good molding properties, including a melt flow index for sufficient flow into the mold, good mold release properties and good finished appearance.

From a practical point of view, it is desirable that satisfactory properties, as outlined above, be attained using water heated molds. That is, molds heated to temperatures between 76.7° C. (170° F.) to about 113° C. (235° F.). In order to accomplish this, it is desirable for crystallization to begin at as high a temperature as possible upon the cooling of the polyester which was fed into the mold, and continue during the cooling to as low a temperature as possible. $T_{cc}$ is a measurement to determine at what temperature crystals first appear upon cooling from the melt. $T_{ch}$ is a measurement which indicates the temperature at which crystallization is no longer occurring upon cooling. It has been found that mold appearance and mold release properties can be related to $T_{ch}$. $T_{ch}$ is determined by measuring the temperature at which crystals appear upon heating an amorphous piece of polyester. $T_{cc}$ and $T_{ch}$ can be measured using a Differential Scanning Calorimeter.

SUMMARY OF THE INVENTION

This invention is a composition comprising polyethylene terephthalate which contains up to 10% based on the weight of the polyethylene terephthalate of the reaction product of a low viscosity linear saturated polyester having an intrinsic viscosity of from 0.05 to 0.6 and preferably 0.1 to 0.4 and a compound having at least one functional group selected from the class consisting of anhydrides, epoxides, and hydroxyls. The polyethylene terephthalate has an intrinsic viscosity of 0.3 to 1.2 and preferably 0.4 to 0.7. The reaction product can be made of the linear saturated polyester and from 0.05 to 100%, preferably 0.1 to 20% based on the weight of the low viscosity polyester of the functional group compound. The amount of functional group compound depends on the number of functional groups in the functional group compound and the molecular weights of the polyester and the functional group compound.

In the preferred embodiment of the composition of the present invention, there is from 0.5 to 10% and preferably 0.1 to 5 percent based on the weight of the polyethylene terephthalate of the reaction product. The amount of the reaction product can vary depending on the relative amount of functional groups in the reaction product. The composition of the present invention preferably contains up to 20 percent based on the weight of the polyethylene terephthalate of a plasticizer. The composition can also contain up to 10% of an impact modifier. The composition can be filled with up to about 150%, preferably 30 to 90%, based on the weight of a polyethylene terephthalate of a filler.

The present invention is a polyethylene terephthalate composition which can be molded in water heated molds. It contains the described nucleating agent and can contain a plasticizer to widen the spread between $T_{cc}$ and $T_{ch}$. That is, the $T_{cc}$ is increased and the $T_{ch}$ is decreased, thereby allowing crystallization to occur over as wide a range as possible.

Objects, features and advantages of the present invention will become apparent by reference to the following specification:

DESCRIPTION OF THE PREFERRED EMBODIMENTS

This invention relates to a composition comprising a mixture of a linear saturated polyester, preferably polyethylene terephthalate, and up to 10% based on the weight of the polyethylene terephthalate of the reaction product of a low viscosity linear saturated polyester having an intrinsic viscosity of from 0.05 to 0.6, preferably 0.1 to 0.4 and a compound having at least one functional group selective from the class consisting of anhydrides, epoxides and hydroxyls.

The composition of the present invention includes linear, saturated polyesters of aromatic dicarboxylic acids. The preferred linear saturated polyesters include polyethylene terephthalate, polybutylene terephthalate, and poly(1,4-cyclohexane dimethylene terephthalate), with polyethylene terephthalate being most preferred due to the low molding temperatures possible. The polyethylene terephthalate for use with the present invention has an intrinsic viscosity range between about 0.4 and about 1.20, with a preferred intrinsic viscosity range between about 0.4 and 0.7. Intrinsic viscosity is obtained by extrapolation of viscosity values to zero concentration of solutions of poly(ethylene terephthalate) in a 60 to 40 weight/volume ratio of phenol and tetrachloroethane. The measurements are normalized to 25° C. The polyethylene terephthalate can contain minor amounts, up to 5%, of other comonomers such as 1,4cyclohexyldimethyldiol, butyldiol, neopentyldiol, diethylene glycol, or glutaric acid.

The reaction product is the reaction product of a low viscosity linear saturated polyester having an intrinsic viscosity of from 0.05 to 0.6, preferably from 0.1 to 0.4. The intrinsic viscosity is measured by extrapolation of viscosity values to zero concentration of solutions of the linear saturated polyester in a 60 to 40 weight to volume ratio of phenol and tetrachloroethane. The measurements are normalized to 25° C. The low viscosity linear saturated polyester is formed from an aromatic dicarboxylic acid and a diol having from 2 to 10 carbon atoms. Preferred low viscosity linear saturated polyesters include polyethylene terephthalate, polybutylene terephthalate, poly(1,4cyclohexane dimethyleneterephthalate). Polyethylene terephthalate is the most preferred. The reaction product of the present invention has been found to be soluble in phenol and tetrachloroethane mixtures. This suggests that it is not a highly cross-linked material.

The low viscosity polyester can be a modified polyethylene terephthalate which contain varying amount of other monomers. Other aromatic or aliphatic dicarboxylic acids, for example isophthalic acid, naphthalene-2,6-dicarboxylic acid or adipic acid can be polymerized into the polyester chain. Alternately, modified polyethylene terephthalates may be used which contain an alcoholic component besides ethylene glycol or other aliphatic diols, for example neopentyl glycol or butane-diol-1,4. Polyesters of hydroxy carboxylic acids may also be used.

The compound which reacts with the low viscosity linear saturated polyester having an intrinsic viscosity of from 0.05 to 0.6 has at least one functional group selected from the class consisting of anhydrides, epoxides, and hydroxyls. The relative amounts of the compound having the functional group can vary depending upon the number of functional groups in relation to the total molecular weight of the compound having the functional groups. The compound having the functional groups can react with the alcohol or acid chain ends of the linear saturated polyester having an intrinsic viscosity of 0.05 to 0.6, depending on the functional group. Reaction of the functional group with the middle of the polyethylene terephthalate or ester interchange would give similar results. There can be an excess of the compound having a functional group without detrimental effect to the polyethylene terephthalate composition.

Depending upon the compound having at least one functional group there can be from 0.01 to 100%, and preferably from 0.5 to 30% and more preferably from 1.0 to 20% of the compound having at least one functional group based on the weight of the low viscosity linear saturated polyester.

The reaction product of the low viscosity linear saturated polyester and the compound having at least one functional group behaves as a nucleating agent. The extent to which the reaction product nucleates can be indicated by measuring the $T_{cc}$. There can be from 0.1 to 10% and preferably 0.5 to 5% based on the weight of the polyethylene terephthalate of the reaction product of the linear saturated polyester having an intrinsic viscosity of from 0.05 to 0.6 and a compound having at least one functional group.

The temperature at which crystal formation is first measurable is $T_{cc}$. The $T_{cc}$ is measured using a Differential Scanning Calorimeter. Between 5 and 10 milligrams of sample is prepared. The sample can be made in the form of a compression molded film which is vacuum dried or as a pellet which is hammered flat. The sample is placed in the Differential Scanning Calorimeter and heated to 280° C. where it is held for two minutes. The sample is cooled at 10° C. per minute. The $T_{cc}$ appears as a sharp peak in the cooling branch of the curve. The $T_{cc}$ is approximately 190° C. to 195° C. for polyethylene terephthalate having an intrinsic viscosity normalized to about 0.6. It is desirable for crystallization from the melt to begin at as high a temperature as possible without adversely affecting other properties. This allows crystal nucleation to begin earlier and for crystallization to take place over a greater temperature range. The $T_{cc}$ is preferably at least 205° C., and more preferably at least 210° C. The $T_{cc}$ has been increased to as high as 214° C. using the reaction product of the present invention.

The line width of the $T_{cc}$ peak gives an indication of the rate of crystallization. The line width is the width at half the height of the peak of the curve measured by using the Differential Scanning Calorimeter. Polyethylene terephthalate, having an intrinsic viscosity of 0.6 has a line width of about 20° C. Faster crystallization using the nucleator of the present invention has a width of 7°–10° C.

The compound having at least one functional group is selected from the class consisting of anhydrides, epoxides and hydroxyls. Where the functional group is an anhydride compound the anhydride can have one or more functional groups. The anhydride can be an organic anhydride or a polymeric anhydride or mixtures thereof. Preferred organic anhydrides are 3,3',4,4'-benzophenone tetracarboxylic dianhydride and dodecenyl succinic anhydride. Where the anhydride compound is a polyanhydride it can be selected from polymeric anhydrides including copolymeric anhydrides as well as homopolymeric anhydrides. A preferred copolymer is the copolymer of an alkyl vinyl ether and maleic anhydride, more preferably the copolymer of methyl vinyl ether and maleic anhydride. The formula of the copolymeric anhydride of an alkyl vinyl ether useful in the present invention is as follows:

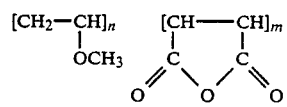

where n and m are integers greater or equal to 2.

Useful polymeric anhydrides have the repeating unit having the following formula:

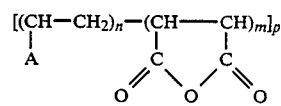

where n and m are integers greater than or equal to 1, where A is H or an alkyl group and p is greater or equal to 2. A preferred polyanhydride has the formula as follows:

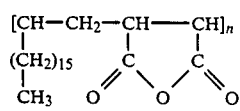

where n is greater or equal to 2.

Where the functional group is an epoxy compound the epoxy compound can be selected from an organic epoxy, a polymeric epoxy, or a mixture thereof. Organic epoxies useful as the functional group in the present invention can have at least one functional group and preferably two or more functional groups. Useful organic epoxies include but are not limited to: octyl stearate epoxy, octyl tallate epoxy, glycidyl alkyl ethers, and glycidyl aryl ethers. The epoxy can be a polyepoxide which can include but are not limited to epoxidized soybean oil, epoxidized linseed oil, the epoxy formed from bisphenol-A and epichlorohydrin, and the reaction product of ortho-cresol novolak and epichlorohydrin. Other polyepoxides where the bisphenol-A is replaced by hydroxyl-containing compounds such as resorcinol, hydroquinone, glycols, and glycerol can be used. Glycidyl ethers can be made with aromatic or aliphatic groups including polymers.

Where the compound having at least one functional group is a hydroxyl compound, organic hydroxyl compounds or polymeric hydroxyl compounds can be used. A preferred organic containing hydroxyl compound is neopentyl glycol. Preferred polymers containing hydroxyl groups include polyvinyl alcohol and the copolymer of ethylene and ethylene vinyl alcohol.

Other useful polyfunctional compounds which can be used as a compound having at least one functional group to react with the linear saturated polyester are those included in U.S. Pat. No. 3,843,615 at column 2, lines 9-60, hereby incorporated by reference.

The reaction product can be made to have a variety of properties depending on the functional group compound. Properties that can be varied include mold release, impact resistances, surface appearance and plasticizing effects.

Any suitable filler can be used. The fillers may optionally be treated with various coupling agents or adhesion promotors as is known to those skilled in the art. Such fillers may be selected from a wide variety of minerals, metals, metal oxides, siliceous materials, metal salts, and materials thereof. Examples of fillers include glass fibers, alumina, feldspar, asbestos, talc, calcium carbonates, clay, carbon black, quartz, novaculite and other forms of silica, kaolinite, bentonite, garnet, mica, saponite, etc. The foregoing recited fillers are illustrative only and are not meant to limit the scope of the fillers that can be utilized in this invention. As noted above, the most preferred filler is glass fibers. There is up to 150 percent by weight of the polyethylene terephthalate of filler, and preferably 30 percent to 90 percent by weight of the polyethylene terephthalate of filler, preferably fiberglass.

It is preferred to use a plasticizer in the composition of the present invention. The plasticizers which can be used with the composition of the present invention are of the type known in the art which can be used with linear saturated polyester molding compositions, preferably polyethylene terephthalate. Aliphatic or aromatic hydrocarbon based plasticizers can be used. A nonlimiting group of plasticizers which can be used is found in U.S. Pat. No. 4,352,904. The plasticizers disclosed are organic esters. The organic esters can be the product of an aromatic carboxylic acid of 7 to 11 carbon atoms containing at least one carboxyl group per aromatic nucleus, and an alcohol selected from those of the formula (HOCH$_2$)$_x$R' wherein x is 1, 2 or 3 and R' is a hydrocarbon radical of 2 to 15 carbon atoms (preferably 2 to 10 carbon atoms) or those of the formula HO—(R"O)HO—(R"O)$_y$R'" wherein y is a cardinal number between 1 and 8, R" is a hydrocarbon radical of 2 to 15 carbon atoms (preferably 2 to 8 carbon atoms) and R'" is —H or a hydrocarbon radical of 2 to 20 carbon atoms (preferably 2 to 12 carbon atoms). The plasticizer disclosed can also be the product of an aliphatic carboxylic acid of 1 to 20 carbon atoms containing 1 to 3 carboxyl groups, and an alcohol of the formula HO(R"O)$_y$R'", wherein R", R'" and y are defined above. Further, the plasticizers disclosed include the following:
organic ketones of the formula

organic sulfones of the formula RSOOR;
organic sulfoxides of the formula R$_2$SO;
organic nitriles of the formula RCN; and
organic amides of the formula

wherein R is a hydrocarbyl group of 1 to 25 carbons, and R' is a hydrogen or hydrocarbyl group of 1 to 25 carbon atoms.

A preferred aliphatic plasticizer is dioctyladipate, and a preferred aromatic plasticizer is neopentyl glycol dibenzoate. Also preferred is para-n-alkyltoluene sulfonamide. Other aromatic plasticizers which can be used include: triethylene glycol dibenzoate, glyceryl tribenzoate, trimethylolethane, tribenzoate and pentaerythritol tetrabenzoate. In the present invention, up to about 20 percent by weight of the polyester of a plasticizer can be used. Preferably, there is between about 2 percent and 10 percent, based on the weight of the polyethylene terephthalate, of plasticizer and most preferably there is between about 2 percent and about 6 percent, based on the weight of the polyethylene terephthalate, of plasticizer.

It has been found that the use of a plasticizer and the type of plasticizer affect the mold release properties and molded appearance of the molded polyethylene terephthalate article. $T_{ch}$ is the temperature at which crystals are first measured upon heating an amorphous piece of polyester. The use of a plasticizer reduces the $T_{ch}$. The $T_{ch}$ for pure polyethylene terephthalate is approximately 125° C. It is desirable to lower this value as much as possible for the best mold release and molded article release properties. The preferred polyethylene terephthalate composition should have as high a $T_{cc}$ as possible and as low a $T_{ch}$ as possible, allowing crystal formation and growth over the widest possible temperature range. The $T_{ch}$ is preferably not greater than about 110° C. It has been decreased to about 102° C. using 4 percent, based on the weight of the polyethylene terephthalate, of dioctyl adipate. Therefore, the temperature range over which crystallization can occur is from about 220° C. to about at least as low as 100° C. during cooling of the composition of the present invention. The range for pure polyethylene terephthalate is about 195° C. to 125° C.

Preferably, copolymers of ethylene and carboxylic acids or their esters or metal salts (ionomers) can be used as impact modifiers. Included in these impact modifiers are the following copolymers: ethylene acrylic acid, methylene acrylic acid, ethylene ethyl acrylate, ethylene vinyl acetate, ionomers, and mixtures thereof. There can be up to about 10 percent, and preferably between about 2 percent and about 6 percent, based on the weight of the polyethylene terephthalate, of the impact modifier.

The composition can contain up to about 3 percent, based on the weight of the polyethylene terephthalate, of a polyepoxide. The epoxy resin which can be used includes an epoxy formed from bisphenol-A and epichlorohydrin, or polyepoxides obtained by reacting orthocresol novolac and epichlorohydrin. Preferred polyepoxides are epoxy cresol novolac resins of the type produced by Ciba-Geigy Corporation, and include ECN TM 1234, 1273 and 1299. Preferably, there is from 0.1 percent to 0.5 percent, based on the weight of the polyethylene terephthalate, of polyepoxide. The polyepoxides act as chain extenders and help compensate for polyethylene terephthalate chains broken by hydrolysis.

Optionally, nucleating agents known in the art, such as inert nucleating agents, can be used in addition to the nucleating agents of the present invention. Talc is an example of a preferred inert nucleating agent. Organic nucleating agents such as the sodium salts of organic and polymeric carboxylic acids can also be used.

In addition to the components discussed above, the compositions of the present invention can contain additives commonly employed with polyester resins, such as colorants, mold release agents, antioxidants, ultraviolet light stabilizers and the like.

A preferred filled composition comprises polyethylene terephthalate, from about 60 percent to 120 percent glass fibers, from about 3 percent to about 6 percent neopentyl glycol dibenzoate, from about 0.6 percent to 1.2 percent of the reaction product and from about 0.2 percent to about 0.8 percent of polyepoxide. There can be from about 2 percent to 4 percent of a mixture of ethylene acrylic acid copolymer and ethylene ethyl acrylate copolymer. The percents are based on the weight of polyethylene terephthalate.

As indicated in the examples to follow, the use of the reaction product of the low viscosity linear saturated polyester having an intrinsic viscosity of from 0.05 to 0.6 and a compound having at least one functional group selected from epoxides, anhydrides and hydroxyls results in a polyethylene terephthalate molding composition which can be injection molded into water heated molds at temperatures as low as 76.7° C. (170° F.). As the mold temperature increases, there is improvement in the molded article appearance. It is noted that the $T_{ch}$ in every case where the reaction product is used is low enough for satisfactory molding in a water heated mold.

The reaction product of the linear saturated polyester having an intrinsic viscosity of from 0.05 to 0.6 and a compound having at least one functional group selected from anhydrides, epoxides and hydroxyls can be made by heating the linear saturated polyester and the compound containing at least one functional group together. Preferably the two components are melt blended. In the most preferred embodiment they can be melt blended in an extruder at a temperature above the melt temperature of the low viscosity polyester. In a preferred embodiment the two components are melt blended at a temperature between 450° F. and 600° F. in an extruder.

The polyethylene terephthalate composition of the present invention can be formed by blending the components together by any convenient means to obtain an intimate blend. Neither temperature nor pressure are critical. For example, the polyethylene terephthalate can be mixed dry in a suitable blender or tumbler with the other components and the mixture melt extruded. The exudate can be chopped. If desired, a reinforcing or filling agent can be omitted initially and added after the first melt, and the resulting mixture can be melt extruded.

The composition of the present invention is particularly useful to make injection molded articles.

The examples and compositions set forth below illustrate the nature of the invention and the manner of carrying it out. However, the invention should not be considered as being limited to the details thereof. All parts are percent by weight unless otherwise indicated.

EXAMPLES

In the examples, the reaction product of a low viscosity linear saturated polyester and a compound having at least one functional group selected from the class consisting of anhydrides, epoxides and hydroxyls was prepared using a Wayne Machine 1-inch single screw extruder operating at about 271° C. (520° F.) and 50 rpm (Speed 1.5).

The polyethylene terephthalate compositions were made using the same extruder at 271° C. (520° F.) and 200 rpm (Speed 4). The polyethylene terephthalate used had an intrinsic viscosity of 0.95 unless indicated otherwise.

EXAMPLES 1-15

Examples 1-15 are examples illustrating the reaction product of a low viscosity polyethylene terephthalate and a compound having at least one functional group.

In Example 1, the compound having at least one functional group was a polyanhydride resin produced by the Gulf Oil Company as PA-18 having the formula:

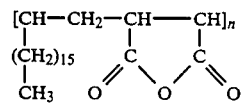

The composition was prepared using 207 grams of 0.17 IV PET and 50 grams of PA-18.

Example 2 was prepared using the copolymer of methyl vinyl ether and maleic anhydride produced by GAF Corporation as Gantrez ® AN-139 (hereinafter AN-139) having the formula as follows:

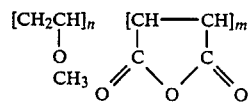

wherein n and m are integers greater than 1. The reaction product was made by mixing 229 grams of 0.17 intrinsic viscosity PET with 25 grams of AN-139.

Example 3 is the reaction product of a 0.17 IV PET and 3,3′,4,4′-benzophenone tetracarboxylic dianhydride produced by the Gulf Oil Company as BTDA (hereinafter BTDA). The reaction product was made by mixing 221 grams of 0.17 IV PET and 25 grams BTDA.

Example 4 is the reaction product of a 0.17 IV PET and an octyl stearate epoxy oil made by the Drapex Company as Drapex 3.2 (hereinafter Drapex 3.2). The Drapex 3.2 has been indicated to have a molecular weight of about 1,000. The reaction product composition was made by mixing 179 grams of 0.17 IV PET with 50 grams of Drapex 3.2.

Example 5 is the reaction product made by mixing an epoxidized linseed oil produced by the Drapex Company as Drapex 10.4 (hereinafter Drapex 10.4) with a 0.17 IV PET. The composition was made by mixing 186 grams of the PET with 20 grams of Drapex 10.4.

Example 6 is the reaction product made by mixing 212 grams of 0.17 IV PET and 15 grams of Ciba Products Company, Araldite RD-2 epoxy which is indicated to have an epoxy equivalent weight of 136, a viscosity at 25° C. of 19 centipoise and gives an IR spectra of 1,4-butanediol diglycidel ether.

Example 7 is the reaction product of 0.17 IV PET and Ciba Products Company, Araldite CY-179 indicated to have an epoxy equivalent weight of 140 and a viscosity at 25° C. of 350 centipoise. It is indicated to have an IR spectra of 3,4-epoxycyclohexylmethyl-3,4 epoxy cyclohexane carboxylate. The mixture was made using 25 grams of cy-179 and 289 grams of 0.17 IV PET.

In Example 8, the reaction product was made using 0.17 IV PET and Ciba Products Company, Araldite 6010. Araldite 6010 is indicated to have an epoxy equivalent weight of from 185–196 and a viscosity at 25° C. of 12,000–6,000. It is indicated to be a diglycedyl ether of bisphenol A (DGEBA) resin. The mixture was made using 25 grams of Araldite 6010 and 179 grams of 0.17 PET.

Example 9 is the reaction product made from Ciba Products Company, Araldite 7074 and 0.17 IV PET. The Araldite 7074 is a DGEBA resin. The composition was made using 100 grams of Araldite 7074 and 140 grams of 0.17 IV PET.

Example 10 is the reaction product of 152 grams of 0.17 IV PET and 25 grams of the epoxy ECN-1299 sold by the CIBA Products Co. and indicated to have an epoxy equivalent weight of 235 and to have the I.R. spectra of polyglycidyl ether orthocresol formaldehyde novolac.

Example 11 is the reaction product of 164 grams of 0.17 IV PET and 5 grams of neopentyl glycol.

Example 12 is the reaction product of 161 grams of 0.17 IV PET and 15 grams of dodecenyl succinic anhydride.

Example 13 is the reaction product of 162 grams of 0.17 IV PET and 2.5 grams polyvinyl alcohol (PVA).

Example 14 is the reaction product of 5 grams of Araldite 6010 and 198 grams of 0.54 IV PET.

Example 15 is the reaction product of 5 grams of PA-18 and 226 grams of 0.54 IV PET.

Example 16 is the reaction product of 2.1 grams of dodecenyl succinic anhydride and 124 grams of 0.54 IV PET.

Comparative 1 is a mixture of 205 grams of PET and 25 grams zinc stearate.

Comparative 2 is a mixture of 252 grams of 0.17 IV PET and 50 grams dimer acid (HOOCC$_{34}$H$_{70}$COOH).

Comparative 3 is a mixture of 100 grams EAA 455 and 157 grams of 0.17 IV PET.

The examples of reaction products and comparatives are summarized on Table 1 below.

TABLE 1

| Ex. | Functional Group (wt %) | | Wt. % PET | IV |
|---|---|---|---|---|
| 1 | 19.5% | PA-18 | 80.5% | 0.17 |
| 2 | 9.8% | AN-139 | 90.2% | 0.17 |
| 3 | 10.2% | BTDA | 89.8% | 0.17 |
| 4 | 14.1% | Drapex 3.2 | 85.9% | 0.17 |
| 5 | 9.7% | Drapex 10.4 | 90.3% | 0.17 |
| 6 | 6.6% | RD-2 | 93.4% | 0.17 |
| 7 | 8% | C-179 | 92.0% | 0.17 |
| 8 | 12.3% | Araldite 6010 | 87.7% | 0.17 |
| 9 | 41.7% | Araldite 7074 | 58.3% | 0.17 |
| 10 | 14.1% | ECN 1299 | 85.9% | 0.17 |
| 11 | 3% | Neopentyl glycol | 97% | 0.17 |
| 12 | 8.5% | dodecenyl succinic anhydride | 91.5% | 0.17 |
| 13 | 1.5% | PVA | 98.5% | 0.17 |
| 14 | 2.5% | Araldite 6010 | 97.5% | 0.54 |
| 15 | 2.2% | PA-18 | 97.8% | 0.54 |
| 16 | 1.7% | decenyl succinic anhydride | 98.3% | 0.54 |
| Comp. | | | | |
| 1 | 10.7% | Zn St | 89.3% | 0.17 |
| 2 | 16.6% | Dimer Acid | 83.4% | 0.17 |
| 3 | 38.9% | EAA 455 | 61.1% | 0.17 |

EXAMPLES 16–31

Following are examples illustrating the use of the reaction product of the present invention in a composition containing 0.95 IV PET.

The nucleated PET was tested by Differential Scanning Calorimetry (DSC). The samples were heated to 300° C. at 80° C./minute, cooled at 160°/minute to 240° C., then cooled at 10° per minute. The $T_{cc}$ was at the peak maximum. The measured IV was used to correct the $T_{cc}$ to its value for 0.6 IV using a plot of IV vs $T_{cc}$ for pure PET. This method may not be reliable for larger corrections, i.e., from 0.75 to 0.6 IV.

The line width at half height (LW$_{\frac{1}{2}}$) was measured for each $T_{cc}$. A correction is not available for the effect of IV on LW. The $T_{cc}$ measures mostly the nucleation of the PET and the LW$_{\frac{1}{2}}$ is related to the rate of crystal growth. Due to the method of measurement, the $T_{cc}$ is also affected by crystallization rate. A good nucleator must have a high $T_{cc}$, a low LW$_{\frac{1}{2}}$, and maintain the intrinsic viscosity of the PET.

The compositions were prepared according to the procedure recited above. The compositions of Examples 16–35 and Comparatives 4–6 include 0.95 IV PET and the amount of reaction product (Examples 16–35) or Comparative nucleator (Comparatives 4–6) summarized in Table 2 below. Comparative 7 illustrates a composition of 0.95 IV PET containing 3.2 weight % 0.17 IV PET with no anhydride, epoxide or hydroxyl reactant. Comparative 8 is a 0.95 IV PET composition containing 0.8 weight percent PA-18. Comparative 9 is a 0.95 IV PET composition containing 0.56% Araldite 6010. In Comparatives 8 and 9 no low IV PET was used. Comparative 10 is a 0.95 IV PET composition containing 0.43% Drapex 10.4. Comparative 11 is a 0.95 IV PET containing 0.37% dodecenyl succinic anhydride. Comparative 12 and 13 are pure PET with no additives.

TABLE 2

| Ex. | Reaction Product | Wt % Reaction Product | IV | Tcc °C. | Tcc °C. .6 IV | LW 1/2 °C. |
|---|---|---|---|---|---|---|
| 16 | Ex. 8 | 1 | .69 | 203 | 209 | 7.5 |
| 17 | Ex. 8 | 4 | .69 | 206 | 212 | 7.0 |
| 18 | Ex. 8 | 7 | .67 | 207 | 211 | 6.5 |

TABLE 2-continued

| Ex. | Reaction Product | Wt % Reaction Product | IV | Tcc °C. | Tcc °C. .6 IV | LW 1/2 °C. |
|---|---|---|---|---|---|---|
| 19 | Ex. 8 | 0.2 | .71 | 198 | 205 | 11.0 |
| 20 | Ex. 9 | 4 | .63 | 202 | 204 | 8.5 |
| 21 | Ex. 10 | 4 | .66 | 207 | 211 | 6.5 |
| 22 | Ex. 4 | 4 | .65 | 205 | 208 | 7.5 |
| 23 | Ex. 5 | 4 | .71 | 207 | 214 | 6.0 |
| 24 | Ex. 8 | 4 | .65 | 204 | 207 | 7.5 |
| 25 | Ex. 7 | 4 | .69 | 203 | 209 | 7.0 |
| 26 | Ex. 2 | 4 | .66 | 204 | 208 | 8.5 |
| 27 | Ex. 3 | 4 | .62 | 203 | 204 | 9.0 |
| 28 | Ex. 1 | 4 | .70 | 204 | 210 | 8.5 |
| 29 | Ex. 1 | 4 | .64 | 207 | 210 | 6.5 |
| 30 | Ex. 11 | 4 | .67 | 205 | 209 | 7.5 |
| 31 | Ex. 12 | 4 | .71 | 205 | 212 | 8.0 |
| 32 | Ex. 13 | 4 | .68 | 206 | 211 | 6.5 |
| Comp. 4 | Comp. 1 | 4 | .51 | 201 | 196 | 10.0 |
| Comp. 5 | Comp. 2 | 4 | .62 | 198 | 199 | 10.5 |
| Comp. 6 | Comp. 3 | 4 | .69 | 200 | 205 | 9.0 |
| 33 | Ex. 14 | 4 | .74 | 195 | 204 | 11.0 |
| 34 | Ex. 15 | 4 | .65 | 200 | 203 | 8.5 |
| 35 | Ex. 16 | 4 | .74 | 201 | 210 | 9.0 |
| Comp. 7 | | | .63 | 198 | 200 | 5.5 |
| Comp. 8 | | | .71 | 202 | 206 | 10.0 |
| Comp. 9 | | | .74 | 200 | 209 | 9.0 |
| Comp. 10 | | | .76 | 189 | 199 | 12.5 |
| Comp. 11 | | | .73 | 191 | 199 | 12.5 |
| Comp. 12 | | | .50 | 200 | 190 | 13.0 |
| Comp. 13 | | | .73 | 177 | 190 | 25.0 |

While exemplary embodiments of the invention have been described, the true scope of the invention is to be determined from the following claims.

What is claimed is:

1. A composition containing: polyethylene terephthalate and from 4 to 10 percent based on the weight of the polyethylene terephthalate of a reaction product of a low viscosity linear saturated polyester having an intrinsic viscosity of from 0.05 to 0.6 and from 1.5 to 150 percent based on the weight of the linear saturated polyester having an intrinsic viscosity of from 0.05 to 0.6 of a compound having more than one functional group selected from the class consisting of anhydrides, epoxides, and hydroxyls, the reaction product being soluble in a mixture of phenol and tetrachloroethane.

2. The composition as recited in claim 1 wherein the compound having a functional group is an anhydride compound having more than one functional group.

3. The composition as recited in claim 2 wherein the anhydride compound is 3,3'4,4'benzophenone tetracarboxylic dianhydride.

4. The composition as recited in claim 2 wherein the anhydride compound is the copolymer of alkyl vinyl ether and maleic anhydride.

5. The composition as recited in claim 1 wherein the functional group is an epoxy compound.

6. The composition as recited in claim 5 wherein the epoxy compound is selected from the group consisting of epoxy formed from bisphenol-A and epichlorohydrin, the reaction product of orthocresol novolac and epichlorohydrin, epoxidized soybean oil, epoxidized linseed oil, glycidyl alkyl ether, and glycidyl aryl ether.

7. The composition as recited in claim 1 wherein the hydroxyl compound is selected from neopentyl glycol and polyvinyl alcohol.

8. The composition as recited in claim 1 further comprising up to 150 percent, based on the weight of the polyethylene terephthalate, of a filler.

9. The composition as recited in claim 1 further comprising up to 15 percent, based on the weight of the polyethylene terephthalate, of a plasticizer.

10. The composition as recited in claim 9, containing sufficient plasticizer for the composition to have a $T_{ch}$ of not greater than 110° C.

11. The composition as recited in claim 1 containing sufficient reaction product for the composition to have a $T_{cc}$ of at least about 210° C.

12. The composition as recited in claim 1 further comprising up to 10 percent, based on the weight of the polyethylene terephthalate, of an impact modifier.

13. The composition as recited in claim 1 further comprising up to about 3 percent, based on the weight of the polyethylene terephthalate, of epoxy.

14. The composition as recited in claim 1 wherein the reaction product is formed by melt blending the linear saturated polyester and the compound having at least one functional group.

15. The composition as recited in claim 14 wherein the melt blending is at 450° F. to 600° F.

* * * * *